June 30, 1942.　　　S. B. GRISCOM　　　2,287,990
ZERO SEQUENCE ISOLATORS
Filed July 12, 1941

WITNESSES:

INVENTOR
Samuel B. Griscom.
BY
Franklin E. Hardy
ATTORNEY

Patented June 30, 1942

2,287,990

UNITED STATES PATENT OFFICE 2,287,990

ZERO SEQUENCE ISOLATOR

Samuel B. Griscom, Wilkinsburg, Pa., assignor to Westinghouse Electric & Manufacturing Company, East Pittsburgh, Pa., a corporation of Pennsylvania Application July 12, 1941, Serial No. 402,175

7 Claims. (Cl. 171—97)

My invention relates to improvements in the protection of alternating current electrical power systems, and particularly to those systems employing ground fault neutralizers of the type in which reactors are tuned to the capacitances to ground of the phase conductors of the circuit, such reactors being commonly known as Petersen coils. In such systems, the grounding reactor or Petersen coil that is connected between the neutral point of the systems and ground is so dimensioned electrically that the reactance of the reactor is so related to the capacitance of the transmission line that upon a single phase fault to ground on the transmission line the flow of the ground current through the reactance of the Petersen coil would extinguish the ground fault current.

It is frequently desirable to interconnect electric power systems by tie lines for the exchange of power between the two systems. However, if the systems so connected have grounded neutralizers and are equipped with different current limiting devices for ground fault protection, or if one system is solidly grounded while the other is grounded through a grounding reactor in the neutral to ground connection, the grounding reactor may be prevented from performing its proper function. For example, if a power system equipped with an arc suppressing reactance type grounding device that is tuned to the capacitance to ground of the ungrounded conductors of the system is connected to a power system having a solidly grounded neutral by a tie line between the two systems, then, in case of a ground fault on the first system, there will flow at the grounded point together with the current due to the ground fault neutralizing device of the first system also a zero phase sequence or ground fault current through the tie line from the second system. Since the ground fault current from the second system is substantially in phase with the voltage, it is not neutralized, and will flow through the ground fault. Therefore, despite the fact that the first system is neutralized, there will be actual current flow into the fault, and the ground fault arc will not be quenched. Since the tuned reactance type of ground fault neutralizing device is not designed to extinguish an in-phase current, it will be apparent that the arc to ground may persist to the detriment of the proper operation of both systems.

It has been proposed to eliminate such trouble by inserting insulating transformers in the tie line between the two systems. While this is a possible way of avoiding the trouble, it increases the cost of the tie line by the transformer equipment required, and the power exchange between the two systems is limited by the capacity of the transformer equipment. It has also been proposed to provide for interrupting the tie line connection between the two systems when a ground fault current flows, so that the flow of zero sequence current to the fault through the tie line from the second system is prevented. While such interruption of the tie line connection permits operation of the ground fault neutralizer to extinguish the arc on its own system, it does so by interrupting the flow of power between the two systems which is undesirable.

It is an object of the invention to provide means for preventing the flow of zero sequence current in the connection between two power systems upon the occurrence of a ground fault on one of the systems.

More specifically, it is an object of the invention to provide means for effecting a high reactance to the flow of current through any one conductor of the tie line circuit while providing a low reactance to the flow of balanced current through the several conductors of the tie line circuit. This is done by providing a zero sequence isolator or polyphase current limiting reactor which will have very low or zero reactance when the currents in the several phase conductors of the circuit are balanced and will have a high reactance to the flow of a line to ground unbalanced current in any phase conductor.

Referring to the drawing.

Figure 1:
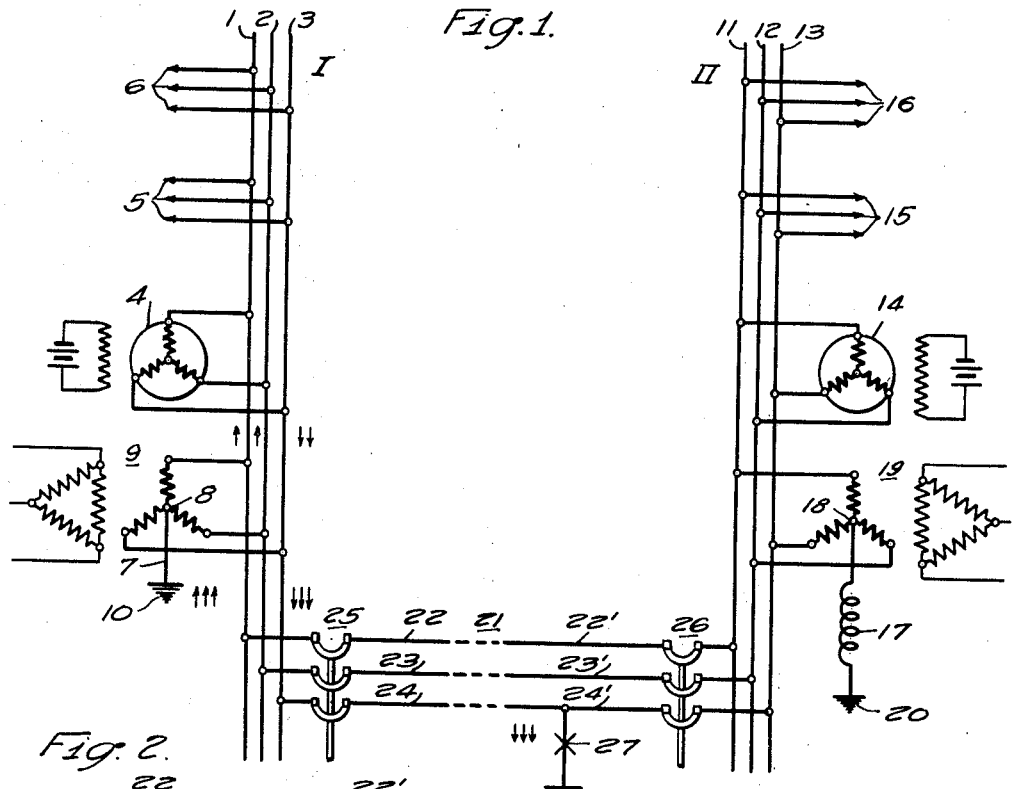
Figure 1 is a diagrammatic view of two interconnected power circuits showing the need for the inclusion in the tie line circuit of means for preventing the flow of zero sequence current.

Referring to Figure 1 of the drawing, the numeral I represents a power system having three-phase conductors 1, 2 and 3 supplied from a generator 4 from which a number of branch circuits 5 and 6 may extend. The system is solidly grounded, as shown by the direct connection 7 from the neutral point 8 of a transformer bank 9 to ground at 10. The numeral II identifies a system similar to Fig. 1, in which phase conductors 11, 12 and 13 are supplied by a generating station 14, and from which any convenient number of supply circuits 15 and 16 may extend. The system II differs from system I essentially in that a neutral grounding device or tuned reactance 17 is provided between the neutral point 18 of the transformer bank 19 and ground at 20, the reactance device 17 having a value of reactance that is so related to the capacitance of the system II that upon a single-phase fault to ground on the system, the flow of ground current through the reactance of the device 17 will extinguish the ground fault current. The two systems I and II are shown connected together through a tie line 21, including phase conductors 22, 23 and 24 and circuit breakers 25 and 26.

It has been assumed that the system II is tuned by means of the reactance device 17 so that the lagging reactive current that will flow through the device 17 in the event of a single-phase accidental ground on one of the phase conductors of the system is essentially the same as the leading reactive current which flows to ground due to the earth capacitance of the remaining line conductors of the system. This is the principle upon which ground fault neutralizers of the Petersen coil type operate to extinguish grounding arcs on the system. If, however, the two circuits are interconnected through the tie line 21 and circuit breakers 25 and 26, and if a ground occurs at 27, current will flow from system I through the ground at 27 and back through the ground connection at 7, thus sustaining the arc at 27 and preventing the ground fault neutralizing device 17 from performing its intended function.

Figure 2:
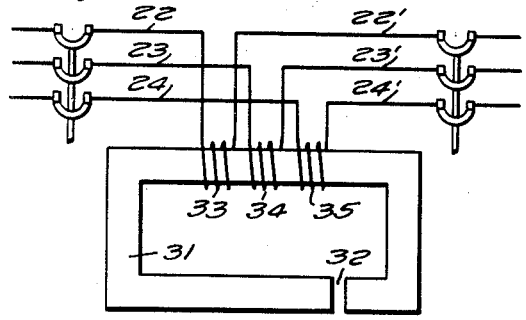
Fig. 2 is a diagrammatic view of a zero sequence isolator or reactor having high reactance to the flow of balanced phase current and low reactance to the flow of current in a single conductor only.

In accordance with the invention, a zero sequence isolator or reactance device, such as shown in Fig. 2, is connected in the tie line circuit between the circuit breakers 25 and 26 and comprises a core structure 31 having a substantially continuous circuit, except for a small air gap 32, and about which core structure three windings 33, 34 and 35 are provided, one winding being connected in series, respectively, with each of the phase circuit conductors of the tie line. The windings 33, 34 and 35 are wound in the same direction and similarly connected to their respective phase conductors and are closely coupled, so that there is small leakage reactance between them. If three-phase power, in which 120° phase relationship exists between the currents in the several windings is passed from conductors 22, 23 and 24 to conductors 22', 23' and 24', or in the reverse direction the device will offer very low impedance to the flow of this power, because at any instant the ampere turns developed in any one winding is nearly counterbalanced by the ampere turns of the other two windings, there being very little leakage flux and consequently a low reactance to the flow of current through the circuit. This same condition exists for any amount of phase-to-phase unbalance of the currents. A similar effect results from the flow of current in two phases in which 180° phase relationship exists.

Figure 3:
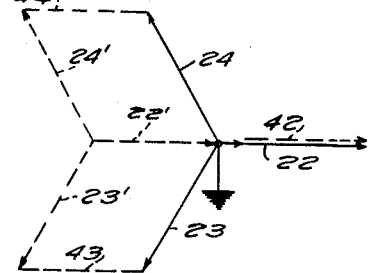
Fig. 3 is a vector diagram illustrating the characteristics of the structure shown in Fig. 2.

If, however, there is a phase-to-neutral unbalance of current, the effect is quite different. With phase-to-neutral unbalance there is a current or component of current in one phase conductor that is not counterbalanced by a like component in either of the other phase conductors. Therefore, the impedance opposed to the flow of such component of current is quite high, because this component of current magnetizes the high permeability iron core. This condition is illustrated in the vector diagram of Fig. 3, it being assumed that the zero sequence isolator of Fig. 2 is connected in the tie line 21 between the circuit breaker 25 and the point of fault 27.

From the vector diagram in which the three solid vectors 22, 23 and 24 represent the phase voltage of the similarly numbered conductors, it will be observed that the voltages shown by the dotted line vectors 42, 43 and 44, which are in phase with each other, will be impressed across the three windings 33, 34 and 35, so that the resultant vector diagram of the phase voltages on conductors 22', 23' and 24' will be as shown in the dash line vectors of Fig. 2.

Because of the high permeability of the iron core, the displacement voltages represented by the dotted line vectors 42, 43 and 44 exist without the flow of a large amount of zero sequence current. In this respect, the zero sequence isolator of my invention differs from the use of delta-delta connected isolating transformer banks in which a relatively large magnetizing current is required. Delta-delta connected isolating transformers have no zero sequence components of magnetizing current but, because of their large size, their total magnetizing kva. and losses are large. Such small magnetizing currents as do flow through the zero sequence isolator of my invention are to a considerable extent of the same nature as those produced by ground fault neutralizers and can, therefore, be subtracted from the total neutralizer current required, thus permitting the use of somewhat smaller neutralizer coils.

Figure 4:
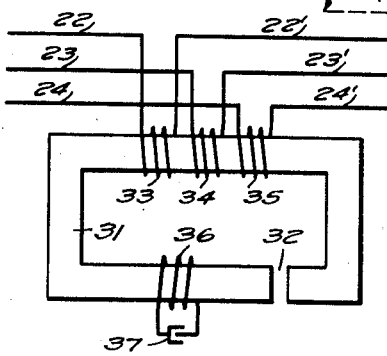
Fig. 4 is a diagrammatic view of a zero sequence isolator in which means is provided for decreasing or eliminating the magnetizing current.

Should the zero sequence magnetizing current be objectionable in certain instances, it may be largely eliminated by providing an additional winding 36, as shown in Fig. 4, about the iron core and connecting it to a capacitor or bank of capacitors 37 of such capacitors that the fundamental frequency reactive component of the core magnetizing current is essentially neutralized for normal phase-to-neutral voltage impressed between terminals 22—22'; 23—23'; and 24—24' of the windings 33, 34 and 35, respectively. Both the auxiliary winding 36 and the capacitor 37 will, therefore, be quite small as the magnetizing current will not ordinarily exceed more than about 3% of the current carrying capacity of the main windings. The added winding 36 and capacitor 37 is particularly desirable in certain instances, where, in case of a ground fault on the solidly grounded neutral system, there would be a tendency to temporarily displace the neutral of the ground fault neutralized system.

It will be appreciated that while the principle of the invention has been described with respect to the usual three-phase alternating current power circuit, it will be effective also in the case of a single-phase circuit in which the coils connected in circuit with the tie line conductor are so wound that the current in the two conductors of the single-phase circuit nominally neutralize each other so that where no ground fault current is flowing, the ampere turns developed in the two windings of the single-phase circuit counterbalance so that no substantially resultant magnetic flux flows in the core structure.

It will be apparent to those skilled in the art that modifications in the circuits and apparatus illustrated and described may be made within the spirit of the invention, and I do not wish to be limited otherwise than by the scope of the appended claims.

I claim as my invention:

1. In combination, two alternating current polyphase electric systems each having a grounded neutral, a tie line circuit interconnecting said systems for the exchange of power between the systems, means comprising a plurality of closely coupled windings, one winding being connected in series with each of the phase conductors of the tie line circuit for introducing a low value of balanced reactance in the circuit and for introducing a high reactance to the flow of zero sequence current.

2. In combination, two alternating current polyphase electric systems, one of said systems having a grounded neutral and the other of said systems having a neutral point grounded through arc suppressing inductive reactance means tuned to the capacity current of the system to suppress the ground fault current of the system on the occurrence of a ground fault thereon, a tie line interconnecting said systems for the exchange of power between the systems, and means comprising a plurality of closely coupled windings, one winding being connected in series with each of the phase conductors of the tie line circuit for introducing a high reactance to the flow of ground fault current between the systems while permitting the ready flow of balanced power current between the systems.

3. In combination, two alternating current polyphase electric systems comprising a plurality of circuit conductors, one of said systems having a grounded neutral and the other of said systems having a grounded arc suppressing inductive reactance means which grounds a point of the system and is so dimensioned electrically as to take up upon the grounding of one phase conductor of the system a current which substantially neutralizes the resultant capacity current flowing to ground over the ungrounded phase conductors of the system, a tie line interconnecting said systems for exchange of power between the systems, and means comprising a plurality of closely coupled windings, one winding being connected in series with each of the phase conductors of the tie line circuit for introducing a high reactance to the flow of zero sequence current through the tie line circuit conductors while permitting the ready flow of balanced power current between the systems.

4. In combination, two alternating current electric systems each comprising a plurality of circuit conductors, one of said systems having a grounded neutral and the other of said systems having a grounded arc suppressing inductive reactance means to suppress the ground fault current of the system on the occurrence of a ground fault thereon, a tie line interconnecting said systems for exchange of power, and means connected in said tie line for introducing a high reactance to the flow of ground fault current in the tie line circuit conductors connected between the systems, while permitting the ready flow of balanced power current between the systems, comprising an iron core about which is provided a winding for each phase conductor of the tie line circuit, the several windings being closely coupled and wound in the same direction, and being similarly connected to the several phase conductors.

5. In combination, two alternating current polyphase electric systems comprising a plurality of circuit conductors, one of said systems having a grounded neutral and the other of said systems having a grounded arc suppressing inductive reactance means which grounds a point of the system and is so dimensioned electrically as to take up upon grounding of one phase conductor of the system a current which substantially neutralizes the resultant capacity current flowing to ground over the ungrounded phase conductors of the system, a tie line interconnecting said systems for exchange of power between the systems, and means connected in said tie line for introducing a high reactance to the flow of zero sequence current through the tie line circuit conductors connected between the systems, while permitting the ready flow of balanced polyphase power current between the systems, comprising an iron core about which is provided a winding for each phase conductor of the tie line circuit, the several windings being closely coupled, being wound in the same direction, and being similarly connected to the several phase conductors.

6. In combination, two alternating current electric systems each comprising a plurality of circuit conductors, one of said systems having a grounded neutral and the other of said systems having a grounded arc suppressing inductive reactance means to suppress the ground fault current of the system on the occurrence of a ground fault thereon, a tie line interconnecting said systems for exchange of power, and means connected in said tie line for introducing a high reactance to the flow of ground fault current in the tie line circuit conductors connected between the systems while permitting the ready flow of balanced power current between the systems, comprising an iron core about which is provided a winding for each phase conductor of the tie line circuit, the several windings being closely coupled, being wound in the same direction, and being similarly connected to the several phase conductors, an additional winding on the core and capacitor means connected across this winding of such capacitance that the fundamental frequency reactive component of the core magnetization current is essentially neutralized for normal phase to neutral voltage impressed across the terminals of the phase conductor windings associated with the core.

7. In combination, two alternating current polyphase electric systems comprising a plurality of circuit conductors, one of said systems having a grounded neutral and the other of said systems having a grounded arc suppressing inductive reactance means which grounds a point of the system and is so dimensioned electrically as to take up upon grounding of one phase conductor of the system a current which substantially neutralizes the resultant capacity current flowing to ground over the ungrounded phase conductors of the system, a tie line interconnecting said systems for exchange of power between the systems, and means connected in said tie line for introducing a high reactance to the flow of zero sequence current through the tie line circuit conductors connected between the systems, while permitting the ready flow of balanced polyphase power current between the systems, comprising an iron core about which is provided a winding for each phase conductor of the tie line circuit, the several windings being closely coupled, being wound in the same direction, and being similarly connected to the several phase conductors, an additional winding on the core and capacitor means connected across this winding of such capacitance that the fundamental frequency reactive component of the core magnetization current is essentially neutralized for normal phase to neutral voltage impressed across the terminals of the phase conductor windings associated with the core.

SAMUEL B. GRISCOM.